United States Patent [19]

Acampora

[11] Patent Number: 5,121,240
[45] Date of Patent: Jun. 9, 1992

[54] OPTICAL PACKET TIME COMPRESSION AND EXPANSION

[75] Inventor: Anthony S. Acampora, Freehold, N.J.

[73] Assignee: The Trustees of Columbia University in the City of New York, New York, N.Y.

[21] Appl. No.: 575,395

[22] Filed: Aug. 29, 1990

[51] Int. Cl.⁵ ............................................. H04J 14/08
[52] U.S. Cl. .................................................. 359/138
[58] Field of Search ................. 350/96.15; 455/600, 455/608, 612, 617, 618, 619; 370/1, 4; 359/138

[56] References Cited

U.S. PATENT DOCUMENTS

| | | | |
|---|---|---|---|
| 4,089,584 | 5/1978 | Polczynski | 350/96.16 |
| 4,136,929 | 1/1979 | Suzaki | 350/96.15 |
| 4,166,212 | 8/1979 | Judeinstein | 250/199 |
| 4,206,347 | 6/1980 | Avicola et al. | 455/608 |
| 4,495,656 | 1/1985 | Shaw et al. | 455/608 |
| 4,511,207 | 4/1985 | Newton et al. | 350/96.15 |
| 4,558,920 | 12/1985 | Newton et al. | 350/96.15 |
| 4,625,305 | 11/1986 | Epworth | 370/1 |
| 4,652,079 | 3/1987 | Shaw et al. | 350/96.16 |
| 4,768,190 | 8/1988 | Giancarlo | 370/86 |
| 4,774,706 | 9/1988 | Adams | 370/94 |
| 4,777,661 | 10/1988 | Spillman | 455/605 |
| 4,780,870 | 10/1988 | McHarg et al. | 370/60 |
| 4,792,980 | 12/1988 | Shimizu | 382/56 |
| 4,923,266 | 5/1990 | Bovet et al. | 455/608 |
| 4,923,267 | 5/1990 | Su | 350/96.16 |
| 4,961,621 | 10/1990 | Su | 370/1 |

OTHER PUBLICATIONS

Kenneth P. Jackson et al. "Optical Fiber Delay-Line Signal Processing"-IEEE Transaction's on Microwave Theory and Techniques, vol. MTT-33, No. 3, Mar. 1985.

Primary Examiner—Edward L. Coles, Sr.
Assistant Examiner—L. Pascal
Attorney, Agent, or Firm—Brumbaugh, Graves, Donohue & Raymond

[57] ABSTRACT

An optical pulse packet at electronic data rates is time-compressed in a recirculating optical delay line to produce a compressed optical packet which, after transmission over a high speed optical network, is expanded at optical data rates by use of the inverse of the compression process. The system employs two recirculating optical loops per network node, one for optically compressing a fully formatted electronic packet for transmission onto the network and one for electronically expanding such a packet upon reception.

19 Claims, 4 Drawing Sheets

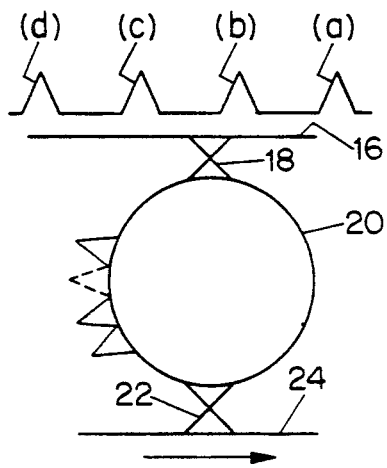
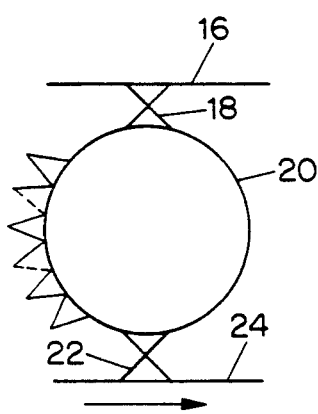
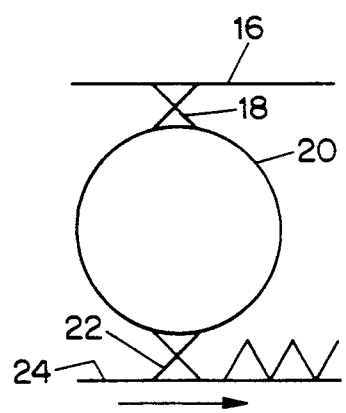
FIG. 2A   FIG. 2B   FIG. 2C
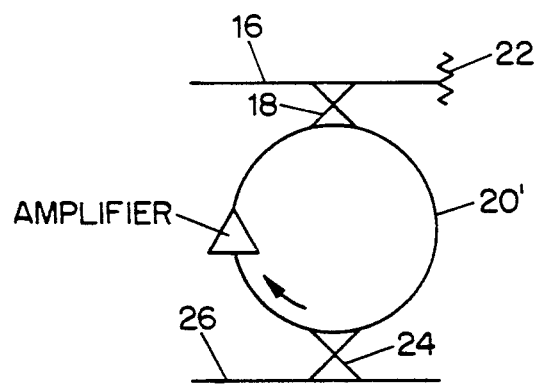
FIG. 4

OPTICAL PACKET TIME COMPRESSION AND EXPANSION

BACKGROUND OF THE INVENTION

This invention relates to communications systems and, more particularly, to a packet compression/expansion system for very high speed optical communication networks.

Multi-user lightwave packet networks have attracted a great deal of interest because of their potential for enormous aggregate capacity, estimated to be in the range of several tens of terabits per second. This large capacity, coupled with the ability to readily integrate multimedia traffic on high speed, self-routing packet streams, invites a number of new, broadband forms of telecommunications services. A fundamental constraint, however, is the so-called electro-optic bottleneck, which restricts the access rate of any one user (or any one network port) to a range no greater than several gigabits per second.

Wavelength division multiplexing has been considered a possible means to create and share a large capacity pool (terabits/second) among a multitude of relatively lower speed network ports. To provide packet-by-packet connectivity, one such scheme, described in an article by L. G. Kazovsky entitled "Multichannel Coherent Optical Communications Systems" published in *Journal of Lightwave Technology*, Vol. LT-5, No. 8, pp. 1 095-1102, 1987, and in a paper by B. Glance et al. entitled "Densely Spaced WDM Optical Star Network", published in *Electron. Lett.* vol. 22, no. 19, pp. 1002-1003, 1986, requires optical elements (lasers and optical filters) tunable over the entire range of active wavelengths on a time scale short as compared to the packet length, plus a fast controller or scheduler to nonconflictingly assign wavelengths to user transmitter/receiver pairs on a packet-by-packet basis. Another scheme described in articles authored by applicant and others entitled "A Multichannel Multihop Local Lightwave Network" published in *IEEE Globecom '87 Conference Record*, Tokyo, Nov. 1987, and "Terabit Lightwave Networks: A Multihop Approach" published in *AT&T Technical Journal*, Vol. 66, No. 6, Nov./Dec. 1987, requiring neither wavelength agility nor a fast controller, involves passing each packet among the nodes of the network, which are connected in a recirculating perfect shuttle pattern with a different wavelength corresponding to each link. Electronic regeneration, storage and retransmission on a different link (wavelength) occurs at each such relaying node until the packet reaches its intended destination.

SUMMARY OF THE INVENTION

The present invention utilizes the more direct approach of time-compressing fully formatted fixed length electronic packets as they are converted and transmitted onto the optical medium, such that each compressed packet occupies an optical bandwidth more compatible with that of the medium. For example, a 1 Gbit/sec. electronic packet optically compressed by a factor of one-hundred (100) would occupy an optical spectrum of roughly 100 GHz, with the inverse (time expansion) process performed at the receiver. This permits compressed packets generated by different nodes to be time multiplexed onto the transmission medium, thereby forming a very high speed packet stream. Each receiving node then filters and accepts only those packets intended for local reception, much as is done with today's electronic-speed single-channel local and metropolitan area networks.

According to a more specific aspect of the invention, time compression is achieved by passively coupling to a recirculating fiber loop an information-modulated stream of very narrow optical pulses, the length of the loop being chosen so as to successively delay the earliest pulse of the input packet by multiples of the temporal duration of the compressed packet. When an entire compressed packet eventually circulates in the loop it is discharged from the loop onto the network medium by an active coupling device such as a waveguide switch.

At the receiver the compressed optical packet is expanded in a second recirculating fiber loop which captures and recirculates a replica of the entire packet. Successive versions of the packet are coupled from the loop on successive recirculations and applied as one input to a high speed photo-conductive switch, a second input of which is driven by a stream of narrow optical pulses having the same period as the modulated pulse stream. This switch performs the logical equivalent of an optical "AND" to recover an uncompressed electronic version of the optical packet.

Other objects, features and advantages of the invention will become apparent, and its construction and operation better understood, from the following detailed description, read in conjunction with the accompanying drawings.

BRIEF DESCRIPTION OF THE DRAWINGS

FIGS. 2A, 2B and 2C are diagrams explanatory of the operation of the compression apparatus of FIG. 1;

FIGS. 4 is a schematic diagram of an alternative construction of the compression apparatus of FIG. 1.

DESCRIPTION OF THE PREFERRED EMBODIMENT

Figure 1:
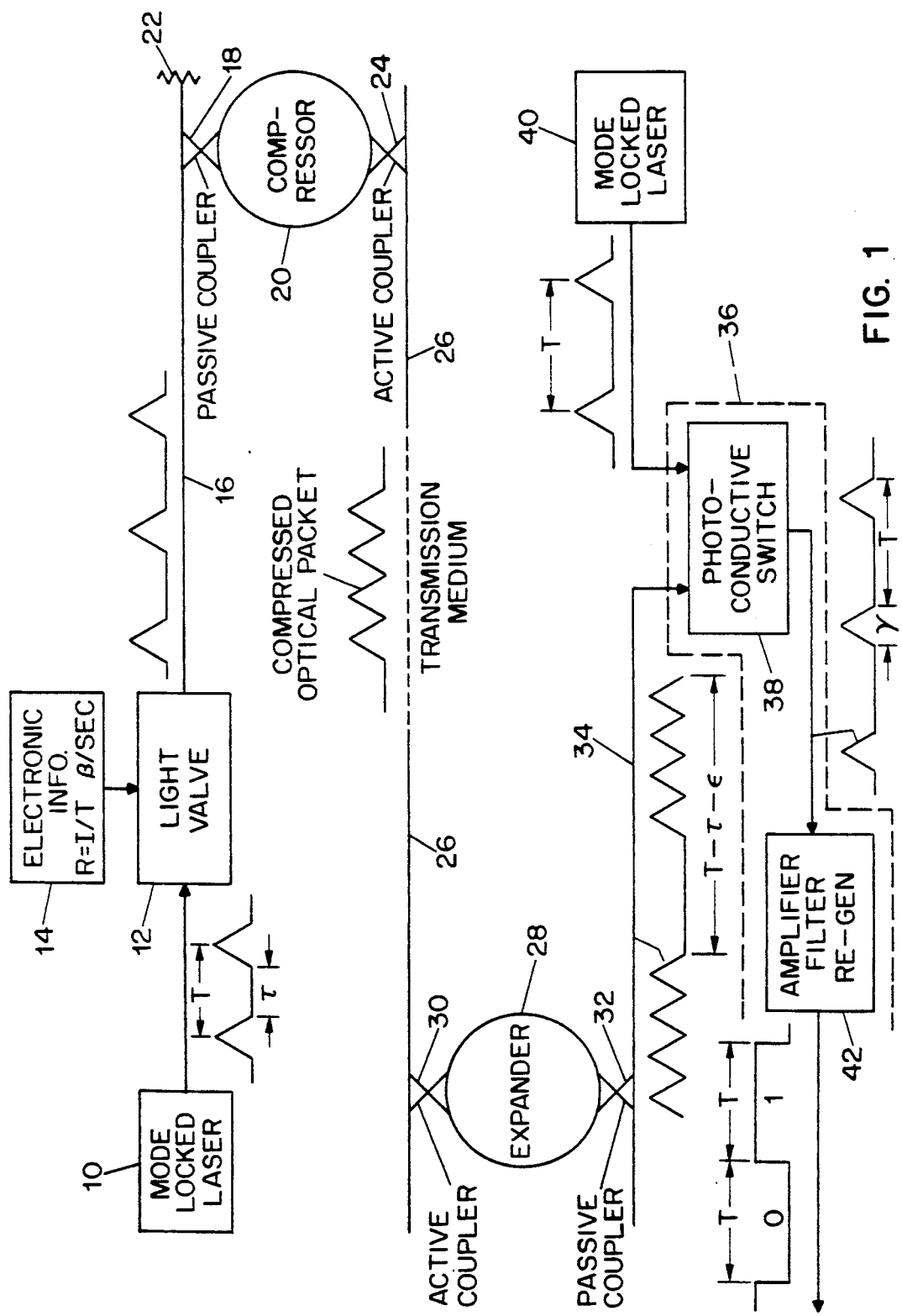
FIG. 1 is a block diagram of an optical communication link embodying packet compression/decompression apparatus constructed in accordance with the present invention.

Apparatus for producing an information-modulated compressed packet, shown in the upper portion of FIG. 1, includes a mode locked or gain switched laser 10 of known construction which generates a stream of narrow pulses having a period of T seconds and a width of τ seconds. A light valve 12, driven by electronic information from a source 14 at a data rate of 1/T bits/second, modulates the stream of light pulses either by passing or blocking individual pulses; light passed corresponds to a logical "one" and light blocked corresponds to a logical "zero". A small fraction of the energy of each pulse produced at the output of modulator 12 is coupled by a light-guiding fiber 16 and a passive coupler 18 into a recirculating optical fiber loop 20, the length of which is chosen to be T-τ-ε, where ε is small compared with τ. Energy not coupled into the loop 20 by the coupler is absorbed by a suitable absorber 22. The fiber loop 20 may be a recirculating delay line consisting of a loop of single-mode optical fiber which has been partially closed upon itself with a fiber directional coupler as described in an article entitled "Optical Fiber Delay-Line Signal Processing" by K. P. Jackson et al., published in *IEEE Transactions on Microwave Theory and Techniques*, Vol. MTT-33, No. 3, March 1985, and passive coupler 18 may be a fiber directional coupler of known construction. An active switch 24, which may be an optical waveguide switch of known construction having "bar" and "cross" states, is provided for coupling energy from loop 20 to an optical transmission medium 26; when set in its "bar" state the loop 20 is closed and very little energy is coupled to transmission medium 26.

Referring to FIG. 2A, T seconds after the first pulse (a) of the formatted packet enters the loop, it has gone around once and in so doing has passed the passive coupler 18 once; the coupler being reciprocal, a small fraction of the energy of each pulse is coupled back out. At the moment the first pulse passes the coupler, the second pulse (b) in the train enters the loop, with its leading edge appearing $\epsilon$ seconds after the trailing edge of the first pulse (a). After elapse of another T seconds, the doublet of pulses (a) and (b) will have passed the coupler 18 and the third pulse (c) arrives and is coupled into the loop. After NT seconds, N bits will be circulating in the loop, one bit every $(\tau+\epsilon)$ seconds, as shown in FIG. 2(B). The packet length in bits, N, is so chosen that there is a sufficient interval between the time the last bit has passed the active switch 24 and the first pulse in the packet again approaches the active switch to set the switch to its "cross" state to couple the entire optical packet onto the transmission medium 26.

It is seen that the apparatus thus far described is capable of compressing an optical packet of length $(N-1)T+\tau$ seconds into an optical packet of length $(N-1)(\tau+\epsilon)+\tau$; if T is much greater than $\tau$, and $\tau$ is much greater than $\epsilon$, a compression factor of $T/\tau$ is achieved. Typically, $\tau$ may be in the range of several picoseconds, and T in the range of several nanoseconds. If, by way of example, $T=1$ nsec, and $\tau=10$ picoseconds, the compression ratio would be greater than 100 so as to yield an optical data rate greater than 100 Gbits/second. However, the number of bits in a packet must be smaller than the compression ratio to prevent the overlapping of bits in the recirculation loop, and, further, must be sufficiently small to provide a time margin long enough to fire the active switch 24, which in the current state of the art, is on the order of 200 to 300 picoseconds.

Summarizing, by choosing an appropriate loop length, the earliest pulse is successively delayed by multiples of the temporal duration of the compressed packet and, eventually, an entire compressed packet is discharged onto the transmission medium 26. Two packets cannot be formed concurrently, which is manifested in a "time out" phenomena which causes packets successively discharged onto the transmission medium to be spaced by a period equal to the product of the compression factor and the temporal length of the compressed packet, which, in turn, prevents a node from accepting or transmitting two packets within such time period.

At the receiver, the packets are expanded (i.e., decompressed) in analogous fashion by a second recirculating loop 28, also of length T-$\tau$-$\epsilon$, to which the incoming compressed packet is coupled by an active coupler 30, such as the aforementioned waveguide switch. With the switch set to its "cross" state, the arriving compressed optical packet destined for that receiver is completely coupled into recirculating loop 28, following which the switch is reset to its "bar" state, thereby to close the loop to prevent both entry of unwanted packets and exit of the captured packet. Each time the captured packet propagates past a passive coupler 32, a small portion of its energy is leaked out to an output line 34 and produces a replica of the entire packet on each recirculation, thereby producing a sequence of such replicas each having a period of T-$\tau$-$\epsilon$, the delay period of loop 28. This sequence is applied to a detector 36, specifically as one input to a photoconductive switch 38, to which a stream of narrow pulses produced by a mode locked laser 40 is applied as a second input. The switch 38 functions as an electro-optic "AND" gate, producing a narrow electronic output pulse only if light is simultaneously present on both inputs. The mode locked laser 40 generates pulses of length : seconds at a repetition rate of 1/T which are so related in phase to the delayed replicas of the compressed optical packet that the output of switch 38 is an electronic replica of the first bit in the first packet of the sequence, followed by the second bit of the second packet of the sequence, and so on, until the Nth bit of the packet has been electronically replicated. This stream of electronic replicas is electronically amplified and filtered and applied to a pulse regenerator (all represented by block 42) which produces a regenerated electronic signal which corresponds to the electronic information signal used to modulate the optical pulse stream at the transmitter.

Figure 3A:
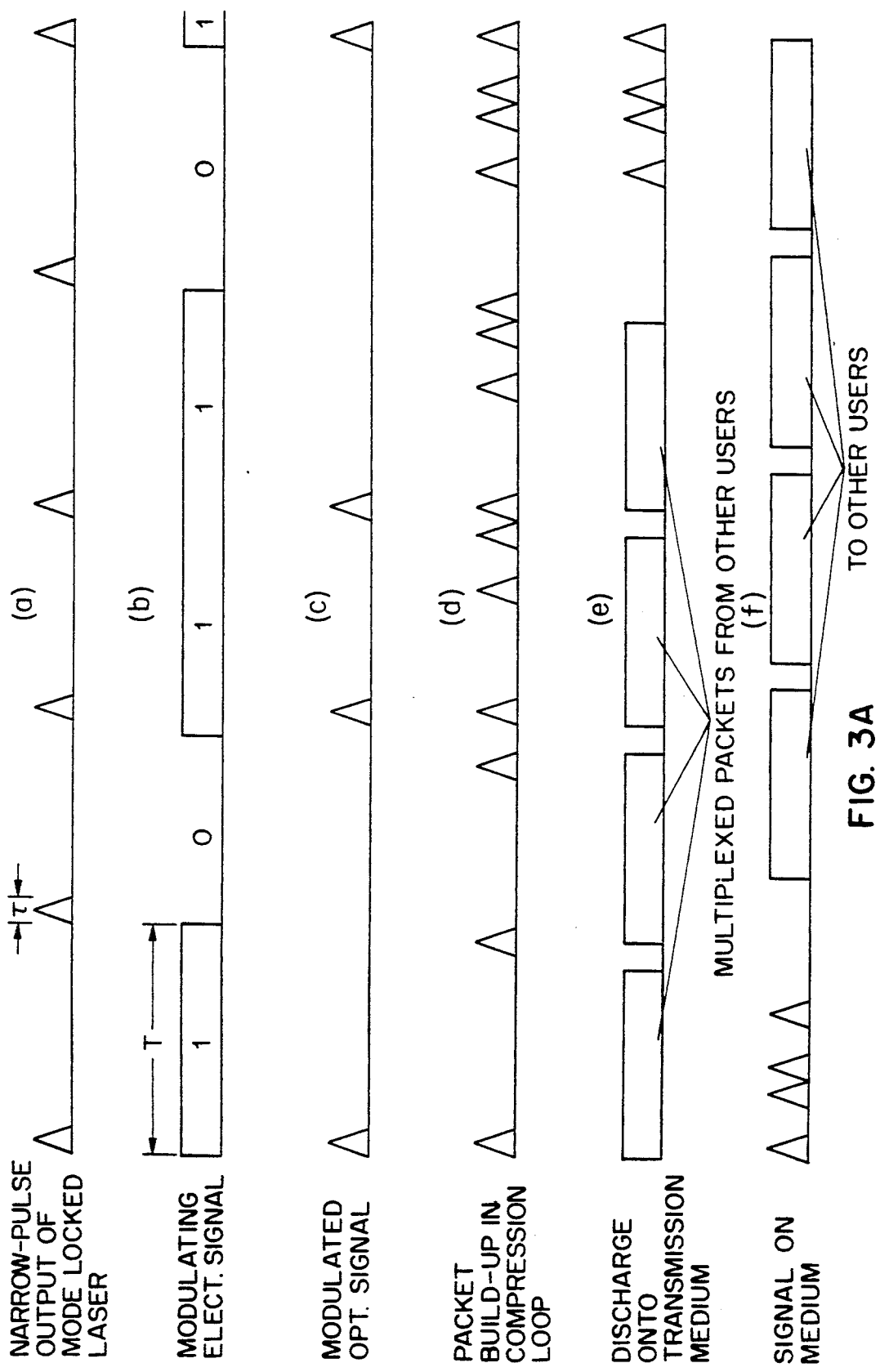
FIGS. 3A and 3B together are timing diagrams useful in explaining the operation of the system of FIG. 1.
Figure 3B:
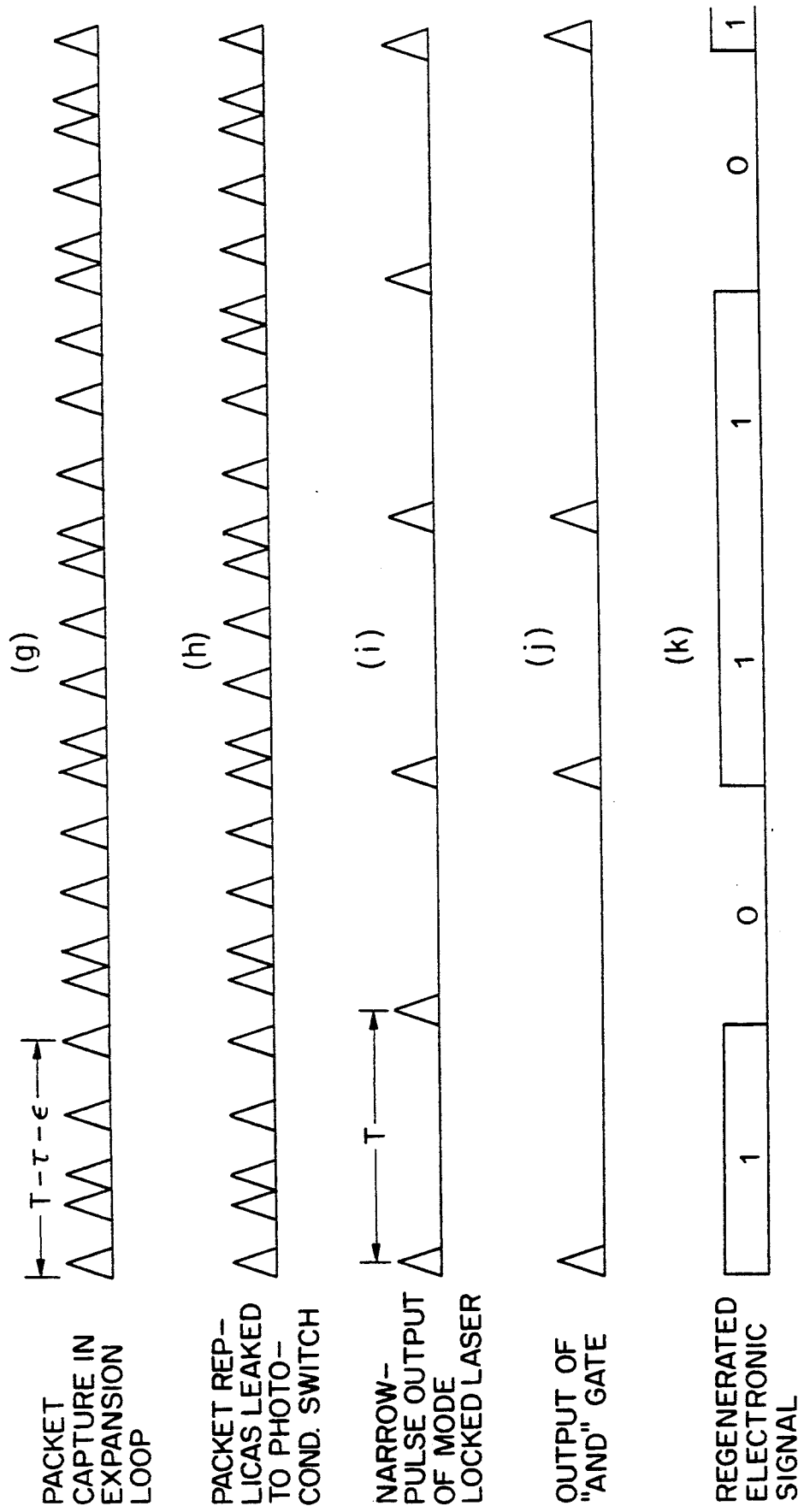

The operation of the system is further illustrated by the timing diagrams shown in FIGS. 3A and 3B which, for simplicity and clarity, have been drawn for a compression factor of six (6). In this example, the information modulating the stream of pulses from laser 10 is the sequence 101101 (waveform (b)) so as to produce the modulated optical signal shown in waveform (c). Waveform (d) shows the packet build up in the compression loop 20 and the $\tau$-second advancement in time occurring on each revolution of the packet as it develops in the compression loop. The fully compressed packet, appearing at the far right in waveform (d), upon discharge onto the medium 26 will normally be time-multiplexed with packets from other users, as shown in waveform (e), and when it arrives at the addressed receiver it is selectively captured in the expansion loop 28, the active coupler of which rejects the packets from other users, shown in waveform (f). As the captured packet recirculates around the loop there is a $\tau$-second advancement in time, as depicted in waveform (g), and each time it passes coupler 32 a packet replica is leaked to the photoconductive switch 38 to produce thereat the packet replicas shown in waveform (h). Since the mode-locked laser produces a pulse stream with a T-second period (waveform (i)), the $\tau$-second time advancement results in different bits of the packet replicas being reproduced at the output of the optical "AND" gate, as depicted in waveform (j), which are used to regenerate the fully expanded and reproduced electronic signals 101101 shown in waveform (k).

The expander loop being the mirror image of the compressor loop, the packet that ultimately yields the last detected bit passes through the loop $N-1$ times, the packet that yields the next to the last bit passes through the loop $N-2$ times, and so on, until the jth bit is exited from the loop, and due to the mirror-symmetry of the two loops all of the pulses have the same level of power when they exit the expander loop.

Power losses that occur in the passive couplers, in the loops themselves, and in the transmission medium linking the transmitter to the receiver, which can limit the size of the packets that can be handled by the system, may be and preferably are offset to the extent possible in order to maximize the optical power produced at the receiver. Such losses may be partially offset, so as to permit formation of longer packets, by incorporating an optical amplifier of known construction in each of the compressor and expander loops; a compressor loop including an amplifier is schematically shown in FIG. 4. The gain of each amplifier is so selected that the overall gain in traversing the loop (coupling loss, fiber loop loss, insertion loss, amplifier gain, etc.) is slightly less than unity to prevent oscillation.

The described compressor/expander system may be used in a variety of known network architectures, including the classical linear bus in which packets formed by geographically distributed compressors are multiplexed onto a transmission bus and sent on a receive bus past a plurality of receivers each including an expander loop for capturing those packets intended for reception thereby. Other networks in which the system may be used are described in an article authored by applicant and M. J. Karol entitled "An Overview of Lightwave Packet Networks", *IEEE Network Magazine*, vol. 3, No. 1, January 1989.

The above-described preferred embodiment is presented for illustrative purposes, it being intended that modifications and alterations thereto fall within the scope of the invention as defined by the following claims.

I claim:

1. Apparatus for time-compressing an input packet of narrow optical pulses consisting of a first stream of narrow optical pulses having a width of $\tau$ seconds and a period of T seconds information-modulated with an N-bit electronic pulse signal having a period of 1/T seconds, said apparatus comprising:

a first recirculating optical fiber loop having a delay of $T-\tau-\epsilon$ seconds, where $\epsilon$ is a time period much shorter than $\tau$, means including passive coupling means for coupling said input packet of optical pulses to said recirculating loop for recirculation therein, and means including active coupling means coupled to said optical fiber loop for coupling therefrom, after said input packet has been recirculated N times, a packet of optical pulses which is time-compressed relative to said input packet by the factor $T/\tau$.

2. Apparatus according to claim 1, wherein said apparatus further comprises:

means for generating said input packet consisting of pulses having a pulse width of $\tau$ seconds and a period of T seconds, and modulator means for modulating said stream of pulses with an N-bit electronic signal having a period of 1/T seconds.

3. An optical communication system comprising:
    an optical transmission medium,
    transmitter means including apparatus according to claim 1 for producing and coupling a time-compressed packet of optical pulses to said transmission medium, and
    receiver means coupled to said transmission medium including means for expanding said time-compressed packet comprising:
        a second recirculating optical fiber loop having the same delay as the optical fiber loop in said transmitter means,
        means including active coupling means for coupling said time-compressed packet of optical pulses from said optical transmission medium to said second recirculating loop,
        means including passive coupling means coupled to said second recirculating optical fiber loop for coupling from said second loop a sequence of replicas of time-compressed packets recirculating therein, and
        means for processing said sequence of replicas coupled from said second loop for recovering therefrom a signal which corresponds to said N-bit electronic pulse signal.

4. An optical communication system according to claim 3, wherein said means for processing said sequence of replicas comprises:
    means for generating a second stream of optical pulses having the same pulse width and period as the pulses in said input stream of pulses,
    means including a photoconductive switch connected to receive as inputs said sequence of replicas and said second stream of optical pulses for producing a narrow electronic pulse each time light is present at both inputs until the last bit of the packet has been replicated, and
    means responsive to said narrow electronic pulses for regenerating said N-bit electronic pulse signal.

5. Apparatus according to claim 1, wherein said first recirculating loop is provided with an optical amplifier for partially offsetting power losses in the loop fiber and in said passive coupling means.

6. Apparatus according to claim 3, wherein said first and second recirculating loops are each provided with an optical amplifier for partially offsetting power losses in its loop fiber, in said passive couplers and in said transmission medium.

7. A method of transmitting electronic-speed information on a very high speed optical medium comprising the steps of:
    forming a fixed length packet of narrow optical pulses information-modulated at electronic speed with an N-bit pulse signal,
    at optical speed, passively coupling said fixed length packet to a first recirculating fiber loop for successively delaying the earliest pulse in said packet by a period shorter than the period of said narrow optical pulses by at least the width of said narrow pulses,
    recirculating the pulses in the loop until a time-compressed N-bit optical packet is circulating in the loop, and
    at electronic speeds, actively coupling the time-compressed optical packet from the loop onto said very high speed optical medium.

8. The method according to claim 7, wherein said forming step includes generating a stream of optical pulses having a pulse width of $\tau$ seconds and a period of T seconds, and modulating said stream of pulses with an N-bit electronic signal having a period of 1/T seconds, and wherein said recirculating loop is selected to successively delay said earliest pulse by $T-\tau-\epsilon$ seconds, where T is much longer than $\tau$ and $\epsilon$ is a time period much shorter than $\tau$.

9. The method according to claim 7, wherein said recirculating step includes the step of amplifying the recirculated pulses.

10. The method according to claim 8, wherein said recirculating step includes the step of amplifying the recirculated pulses.

11. The method according to claim 7, wherein the method comprises the further steps of:
   receiving from the optical medium and expanding the time-compressed optical packet, and
   recovering the N-bit electronic signal.

12. The method according to claim 11, wherein the step of receiving and expanding the time-compressed optical packet includes:
   at electronic speeds, actively coupling the complete time-compressed optical packet to a second recirculating fiber loop and then closing the loop for preventing entry of other packets, and
   at optical speeds, passively coupling from the second loop a sequence of replicas of the packet circulating in the second loop.

13. The method according to claim 12, wherein said method comprises the further steps of processing the sequence of packet replicas and regenerating therefrom said N-bit, electronic speed pulse signal.

14. The method according to claim 12, wherein said second recirculating loop includes an optical amplifier.

15. Apparatus for time-compressing an input packet of optical pulses comprising:
   means for passively coupling at optical speed a fixed length input packet of narrow optical pulses information-modulated at electronic speed with an N-bit pulse signal to a first recirculating optical fiber loop which successively delays the earliest pulse in said packet by a period shorter than the period of said narrow optical pulses by at least the width of said narrow pulses until said packet has been recirculated N times for producing a circulating time-compressed N-bit packet of pulses, and
   means for actively coupling from said loop, at electronic speeds, said circulating time-compressed N-bit packet of pulses.

16. Apparatus according to claim 15, wherein the pulses of said input packet have a pulse width of $\tau$ seconds and a period of T seconds, and
   wherein said first fiber loop successively delays said earliest pulse in said packet by $T-\tau-\epsilon$ seconds, where T is much longer than $\tau$ and $\epsilon$ is a time period much shorter than $\tau$.

17. Apparatus for transmitting electronic speed information on a high speed optical transmission medium, comprising:
   means for forming a fixed length input packet consisting of a stream of narrow optical pulses information-modulated at electronic speed with an N-bit pulse signal,
   means for passively coupling at optical speed said input packet of pulses to a first recirculating optical fiber loop which successively delays the earliest pulse in said packet by a period shorter than the period of said pulses by at least the width of said narrow pulses until a time-compressed N-bit packet of optical pulses is circulating in said first loop,
   an optical transmission medium;
   active coupling means coupled to said first optical fiber loop and to said transmission medium for coupling said time-compressed N-bit packet of optical pulses to said transmission medium at electronic speeds,
   a second recirculating optical fiber loop having the same delay as said first optical fiber loop,
   means for actively coupling said time-compressed N-bit packet of optical pulses from said transmission medium to said second optical fiber loop at electronic speeds for producing in said second loop a circulating sequence of replicas of said time-compressed packet of optical pulses;
   means for coupling said sequence of replicas of time-compressed N-bit packets of pulses from said second loop at optical speed and producing said sequence of replicas, and
   means for recovering from said produced sequence of replicas a signal which corresponds to said N-bit electronic signal.

18. Apparatus according to claim 17, wherein said means for recovering comprises:
   means for generating a stream of optical pulses having the same pulse width and period as the pulses in said input packet,
   means for combining said generated stream of optical pulses with said sequence of replicas which produces a narrow electronic pulse each time light is present in both signals until the last bit of the packet has been replicated, and
   means responsive to said narrow electronic pulses for regenerating said N-bit electronic signal.

19. Apparatus according to claim 17, wherein said means for forming said input packet includes means for generating a stream of optical pulses each having a width of $\tau$ seconds and a period of T seconds, and
   wherein said first and second fiber loops each delays the earliest pulse of a packet of optical pulses coupled thereto by $T-\tau-\epsilon$ seconds, where $\epsilon$ is a time period much shorter than $\tau$.

* * * * *

UNITED STATES PATENT AND TRADEMARK OFFICE
CERTIFICATE OF CORRECTION

PATENT NO. : 5,121,240
DATED : June 9, 1992
INVENTOR(S) : Anthony S. Acampora

It is certified that error appears in the above-identified patent and that said Letters Patent is hereby corrected as shown below:

Col. 4, line 15, "length :" should read -- $\tau$ --.

Signed and Sealed this

Tenth Day of August, 1993

Attest:

MICHAEL K. KIRK

*Attesting Officer*     *Acting Commissioner of Patents and Trademarks*